May 31, 1960     J. K. LIVINGSTON ET AL     2,938,323
COMBINED MOWER, EDGER, AND TRIMMER
Filed Feb. 7, 1956     3 Sheets-Sheet 1
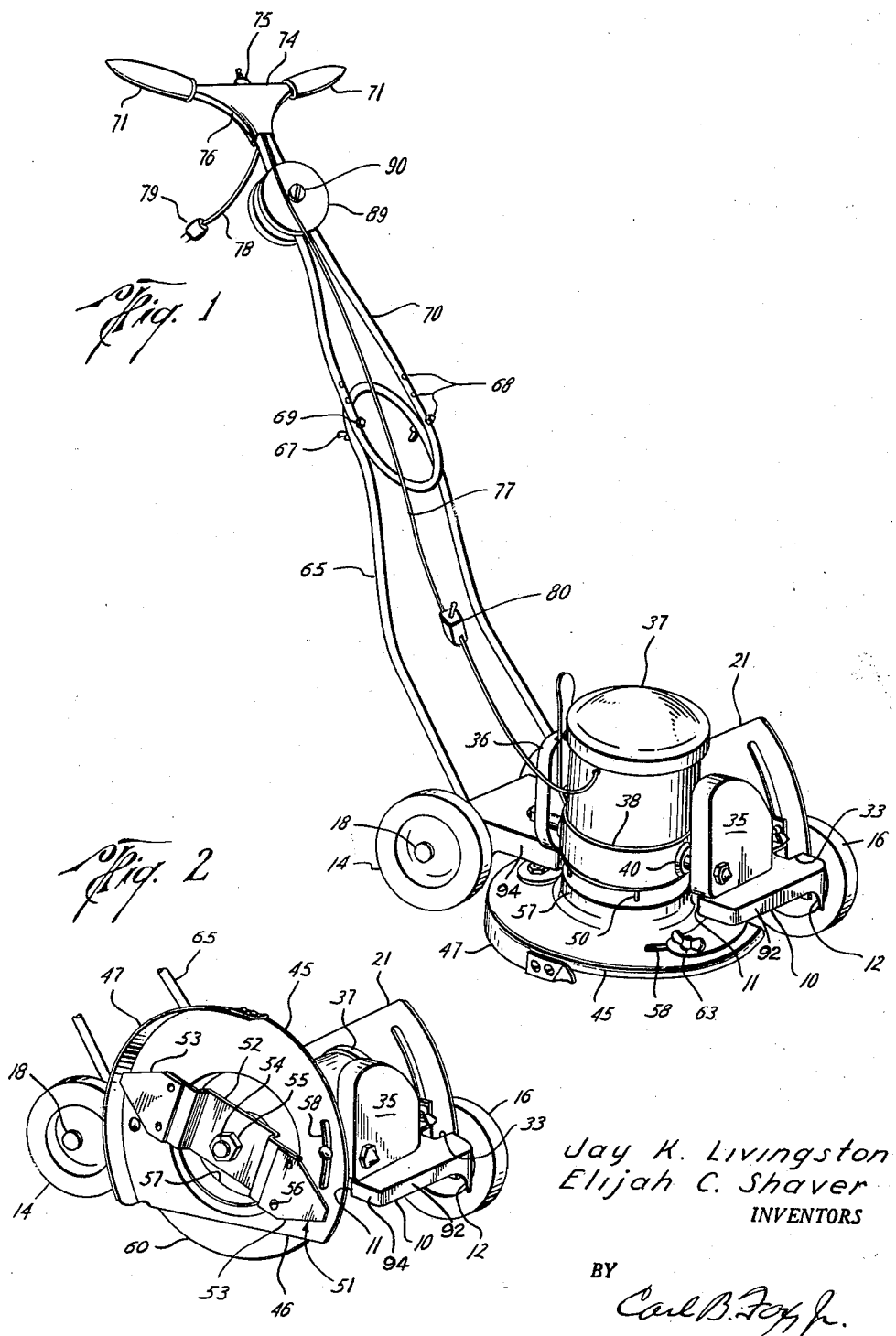
Jay K. Livingston
Elijah C. Shaver
INVENTORS
BY
Carl B. Fox Jr.
ATTORNEY May 31, 1960 J. K. LIVINGSTON ET AL 2,938,323
COMBINED MOWER, EDGER, AND TRIMMER
Filed Feb. 7, 1956 3 Sheets-Sheet 2
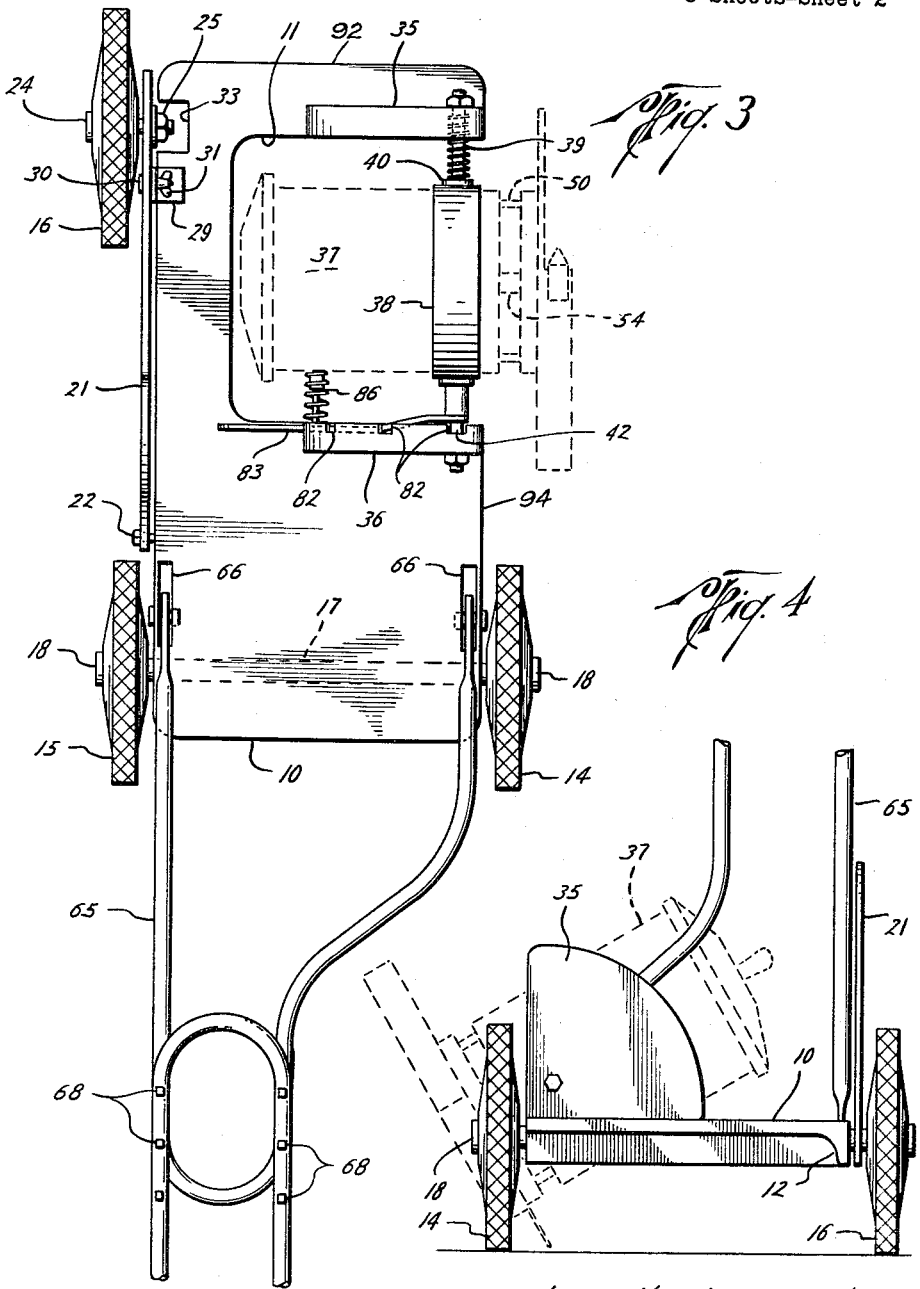
Jay K. Livingston
Elijah C. Shaver
INVENTORS
BY
Carl B. Fox, Jr.
ATTORNEY

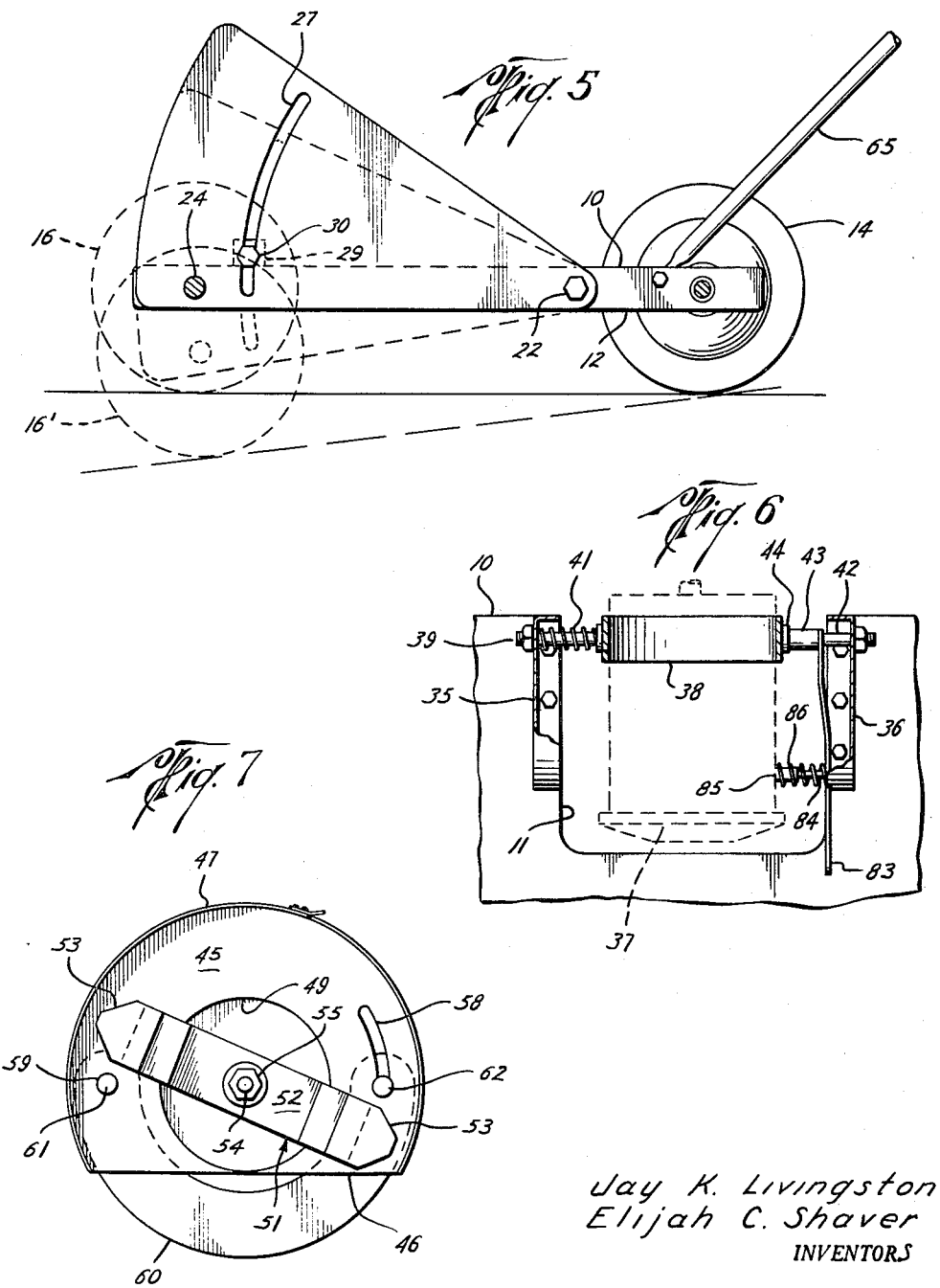

United States Patent Office 2,938,323
Patented May 31, 1960

2,938,323
COMBINED MOWER, EDGER, AND TRIMMER

Jay K. Livingston and Elijah C. Shaver, Houston, Tex.; said Shaver assignor to Brown & Root, Inc., Houston, Tex., a corporation of Texas Filed Feb. 7, 1956, Ser. No. 578,555

2 Claims. (Cl. 56—25.4)

(Filed under Rule 47(a) and 35 U.S.C. 116)

This invention pertains to a device for alternatively, or simultaneously, mowing, edging, and trimming weeds, brush, grass, and other vegetable growths.

It is an object of the invention to provide a single device which will mow, and/or edge, and/or trim vegetable growths.

Another object of the invention is to provide such a device which will mow, edge, and trim in a range of adjustable positions of the cutting blade, and in which there is no structure to interfere with said mowing, edging, and trimming with said blade in any of said adjustable positions.

Another object of the invention is to provide such a device wherein the blade position adjustment is easily and rapidly made.

Another object of the invention is to provide apparatus for mowing, edging, trimming, and the like vegetable growths, said apparatus having means for guiding the cutting means thereof.

Another object of the invention is to provide apparatus for mowing, edging, and trimming grass and other vegetable growths, said apparatus having pivotally mounted drive means and cutting means whereby the cutting angle is adjustable.

A further object of the invention is to provide apparatus for mowing, edging, and trimming vegetable growth which is safe and dependable and yet may be manufactured at low cost.

Other objects, uses, advantages, and improvements of the invention will appear from the following description of a preferred embodiment thereof, reference being made to the accompanying drawings, of which:

Figure 1 is a perspective view of the preferred embodiment with the cutting blade in position for mowing and trimming;

Figure 2 is a partial perspective view similar to Figure 1 with the cutting blade in position for edging and trimming;

Figure 3 is a plan view of the embodiment of Figures 1 and 2, the cutting blade being shown in position for edging and trimming and the blade and drive assembly being shown by dashed lines to indicate the rotative adjustment thereof;

Figure 4 is a front end view of the preferred embodiment, the cutting blades and drive assembly shown by dashed lines in a trimming position intermediate between the postion shown in Figures 1 and 2;

Figure 5 is a side view of the preferred embodiment;

Figure 6 is a partial plan view showing the drive assembly mounting and position adjustment means; and Figure 7 is a partial side elevation showing the cutting means in the edging and trimming position and showing the blade guide means.

Referring to the drawings in detail, the bed 10 of the combination apparatus is generally rectangular in shape and has a rectangular recess or opening 11 from one of its sides above and within which the pivotally mounted drive means is mounted. Bed 10 is formed with downwardly extending flange portions 12 around portions of its sides to reinforce the flat upper surface of the bed. The bed may be conveniently stamped from a flat sheet of metal to form flange portions 12 or it may be fabricated in any other suitable way, as by welding together a bed sheet and flange strips of metal. The inner and outer corners and the edges of the bed are preferably rounded to enhance the appearance of the device and to avoid marring objects struck by the apparatus. Bed 10 is movably supported by a pair of rear wheels 14 and 15 and by a single front wheel 16. The rear wheels are connected to the bed conventionally by an axle 17 held in place by two end lugs 18, axle 17 passing through a pair of holes through flange portions 12 at opposite sides of the bed and near the rear end thereof. The rear wheels may be otherwise mounted in any suitable way and bearings may be provided as required to ease the functioning of the wheels. The single front wheel 16 is pivotally mounted to one forward side of the bed by means of a plate 21 of substantially triangular shape. Plate 21 is pivotally secured to bed 10 by a bolt 22 through a hole in plate 21 and a hole in flange portion 12, to the side of bed 10 and just forward of rear wheel 15. Plate 21 extends almost to the forward end of the bed and has a curved forward edge as shown. Front wheel 16 is turnably connected to plate 21 near the lower forward vertex of plate 21 by an axle bolt 24 and lug 25, bolt 24 passing through a hole through plate 21 at that point with lug 25 being screwed onto the inside end of the bolt. Plate 21 has a narrow curved slot 27 which is located slightly rearward of the connection of wheel 16 to plate 21. The curvature of slot 27 is such that the slot is adjacent a fixed point at the upper surface of bed 10 as plate 21 is rotated about the pivot at bolt 22 as indicated by dashed line positions in Figure 5. At a fixed point on the upper surface of bed 10 corresponding to slot 27, angle 29 is welded to the bed with one side thereof adjacent the slot. A bolt 30 having wingnut 31 screwed thereonto passes through a hole in the angle side adjacent the slot and through the slot, thereby providing means for adjustably fixing the pivotal position of plate 21 with respect to bolt 22 by tightening the wingnut 31 to clamp plate 21 against the angle side adjacent the slot. Wheel 16 being connected to the forward end of plate 21 is raised and lowered as the pivotal position of plate 21 is adjusted. A recess 33 in the side of bed 10 provides clearance for lug 25 to pass beneath the bed as the wheel 16 is lowered to position 16' indicated in Figure 5.

The rectangular side opening 11 is disposed near the forward end 92 of bed 10. Skirts or flange portions 12 are provided around the sides of the opening as well as around the outer sides of the bed to strengthen the bed. No front wheel to support the bed is provided at the side 94 of the bed having the side opening 11.

At the front and rear sides of opening 11 there are provided two supports 35 and 36, respectively, for the drive and cutting assemblies. The support at the front side of opening 11, support 35, has a straight lower side which fits flush against the surface of bed 10 at the side of opening 11, and has a curved upper side, being generally triangular in shape. The support 36 at the rear side of opening 11 is of the same shape as support 35. The lower sides of the supports extend from the side of bed 10 to somewhat over half of the depth of the side opening. At a common height above the bed, each of the supports has a circular hole therethrough, the holes being in alignment on a line parallel with the sides of the bed. An electric drive motor 37 is mounted between supports 35 and 36 within and above opening 11. A collar 38 of strip metal surrounds motor 37 toward the shaft or working end of motor 37. The motor is mounted by means of a front shaft 39, surrounded by a helical spring 41 and connected through upset collar portion 40 at the front side of motor 37 the shaft also passing through the aligned hole in support 35, and by means of a rear shaft 42 having spacer sleeve 43 connected through upset collar portion 44 at the rear side of motor 37 and passing through the aligned hole in support 36. The two shafts 39 and 42 are axially aligned to provide rotation of motor 37 about their common axis, and the axes of both shafts 39, 42 are in line with and perpendicular to the axis of the motor shaft as is best shown by Figures 4 and 6. Opening 11 is deep enough to allow rotation of motor 37 to a position wherein the shaft of the motor is horizontal with the exposed shaft end of the motor at the side of bed 10, and to a position wherein the shaft of the motor is vertical with the exposed shaft end of the motor beneath the level of bed 10.

Referring particularly to Figure 7, and also to Figures 1 and 2, a shield 45, or guard, is flat and is circular in shape with a cut back or straight edge 46 at its lower side. Around a part of the edge of the shield there is a flange 47 which serves to protect the user from the blade and from loose objects struck by the blade. The flange 47 will also protect the user should the blade itself become loosened, this latter being unlikely and of very infrequent occurrence. The shield and flange will, in addition prevent the blade from accidentally striking objects on the ground. The shield has a concentric opening 49 of circular shape through which the motor shaft is received and the shield is securely screwed to the motor by a plurality of screws 50 received through holes in upset collar 57 of the shield being disposed against the end of the motor around the shaft with the edge 46 at the bottom of the shield when the motor shaft is horizontal.

The cutting blade 51, having hub portion 52 from which the cutting portions 53 of the blade extend, is mounted on the motor shaft 54, the shaft end being received through the center opening of the hub and rigidly retained by a nut 55 threadingly connected to the end of the shaft. A key and keyway may be provided to prevent relative motion between the hub and shaft. Each cutting blade 53 is a flat strip having both edges sharpened and beveled and each blade is connected to the hub by a pair of bolts 56. When motor 37 is energized to rotate shaft 54 and hub 52, the cutting blades swing around with the rotating hub in such a way as to cut grass or vegetable growths interposed into the plane of rotative travel of the blades.

The shield 45 is provided with a curved slot 58 near its edge toward the front of the apparatus. A bolt hole 59 is provided near the edge of the shield toward the rear of the apparatus. A flat guide strip 60 of curved outline is pivotally connected at hole 59 by a bolt 61. A bolt 62 having wingnut 63 connects the other end of guide strip 60 at the slot 58. Slot 58 is curved such that when wingnut 63 is loosened, guide strip 60 may rotate about bolt 61 with bolt 62 sliding to a different position in slot 58. Slot 58 is disposed longitudinally such that when guide strip 60 is rotated to its lowest position, a position in which the lower edge of the guide strip substantially completes the circle of the shield, as shown in Figure 7, the bolt 62 is at its lowest position in slot 58, and such that when guide strip 60 is retracted upwardly with its lower edge near or above the shield edge 46, the bolt 62 is at its highest position in slot 58. Slot 58 is curved to permit movement of bolt 62 between these terminal points and to any intermediate point.

When the apparatus is used as an edger, or side trimmer the guide strip 60 serves as means for guiding the apparatus along the edge of a curb or sidewalk or the like, and is automatic in action in that it will of itself drop to the lowered guiding position when the blade assembly is moved to its vertical side position with the motor shaft horizontal. This automatic action occurs because wingnut 63 is normally left loose on the inner end of bolt 62 so that guide strip 60 is free to rotate about bolt 61. Wingnut 63 may be tightened to prevent this automatic movement of guide strip 60 if desired.

A handle (Figures 1 and 3) is provided at the rear end of the apparatus by means of which the apparatus may be moved by a person through grass and vegetation and from place to place as desired. The handle is made in two sections and is adjustable in length. The lower handle section 65 is formed in the shape of an irregular loop or U. The free ends of the loop are pivotally secured to the bed 10 at its opposite sides and near the rear end of the bed, being disposed freely through slots 66 at the sides of the bed and bolted to the bed through flange 12 thereof.

The loop is distorted in its plane in a direction away from the side of the apparatus having no front wheel as is best shown in Figure 3. The distortion is smoothly formed to provide an offset handle, the purpose of which will be described. The loop sides are closer together at the closed end of the loop and a pair of bolt holes 67 are oppositely disposed at both sides near the closed upper end. The upper handle section 70 is formed as a loop inverted with respect to the lower handle section 65, and has a plurality of spaced bolt holes 68 oppositely disposed at both sides of the closed lower end. The bolt holes of the upper section are alignable with those of the lower section in a plurality of positions of different handle length, a pair of bolts 69 being inserted through the aligned holes to each side to secure the handle sections in any of the positions. The free ends of the upper loop section are flared in the plane of the handle to form two grasping portions 71, there being formed between the two free ends an angle substantially closed at its vertex. A substantially triangular element 74 is provided within the angle around the portions of section 70 forming the angle to brace the free sides of the loop and to contain an electric switch 75 which controls the motor 37.

Element 74 is formed from a flat substantially triangular plate having two sides bent and crimped around handle section 70 as indicated at 76.

An electric cord 77 to supply current for energizing motor 37 runs from motor 37 to the switch 75 within element 74. A short electric cord 78 runs from switch 75 to a terminal wall plug 79. A snap switch 80 is included in cord 77, switch 80 also controlling energization of motor 37. An extension cord (not shown) is plugged into plug 79 to supply electric current to motor 37 from any suitable source (not shown). Cords 77 and 78 enter and emerge from element 74 at its lower end between the sides of handle section 70.

Referring particularly to Figure 3, the rear drive support element 36 has a plurality of spaced apart rectangular notches 82 formed into the flange portion thereof around its upper edge. An adjustment lever 83 is engaged at its lower end around the shaft 42. Lever 83 is bent slightly toward support element 36 to engage the notches 82 and is movably connected to the motor 37 by a pin 84 slidably received into a sleeve 85 connected to the motor. A helical spring 86 biases the lever 83 away from the motor and toward the notches in support element 36. The lever 83 provides means for adjusting the plane of cut of the blade 51. When the outer end of lever 83 is pressed against spring 86 in a direction toward motor 37 and away from a notch 82, the motor may be rotated around shafts 39 and 42 by so rotating the lever 83, thereby moving the plane of blade 51. The notches 82 are so disposed around the arcuate upper edge of element 36 that the plane of blade 51 may be moved to be vertical or horizontal or to any position therebetween. The lever 83 being biased toward element 36 by spring 86, once the lever 83 is received into a notch 82 with the motor and cutting assembly being placed thereby in a certain rotative position with respect to the shafts 39 and 42, the motor and cutting assembly are positively locked in that position because the spring 86 will not permit the lever to move out of the notch. In this way, the cutting means may be positioned for mowing, edging, or trimming, as desired.

The lower handle section 65 is offset to the left as has been described. The upper handle 70 has a pair of weight elements 89 bolted thereto below element 74 by a bolt 90. The bed 10 having no front wheel at its right side opposite left front wheel 16, the offset handle and the weight elements are provided to counter-balance the drive and cutting assemblies and maintain the apparatus on an even keel upon the three wheels at the other corners. Weight elements 89 have sufficient bulk for this purpose and are in a position on the offset handle so that the effect of their bulk is at a maximum. The offset handle, in addition, makes it possible for the operator to cut closely against objects to his right side without brushing against such objects with his body and limbs. This is especially convenient when cutting along the edge of a building or around the trunk of a tree or around hedges, and the like.

The bed 10 has no flange portion 12 at its front, which together with the absence of the right front wheel, enables the machine to mow, edge, or trim very close to objects extending above ground level. There is absolutely nothing to interfere with the cutting action of the blade to the front or to the side of the apparatus, unlike conventional apparatus which always has a wheel at each of its four corners.

While a preferred embodiment of the invention has been shown and described herein, many modifications thereof may be made by a person skilled in the art without departing from the spirit of the invention, and it is intended to protect by Letters Patent all forms of the invention falling within the scope of the following claims:

We claim:

1. Apparatus for mowing, edging, and trimming vegetable growths comprising a wheeled body of substantially rectangular flat form and having one shorter side thereof designated the front of the body, said body having a recess therethrough opening at one of the longer body sides, a motor having a rotating shaft at one end disposed within said recess and said motor being pivotally mounted at the end of the motor toward said shaft and adjacent the mouth of said recess, planar cutting means mounted on said shaft for rotation therewith, means on said body adjacent said recess for holding said motor in vertical, horizontal, and a plurality of angular positions about said pivotal mounting with said motor disposed in and/or above said recess, whereby said cutting means may be disposed in a vertical, horizontal, or angular position about said body, dual rearward wheels on said body each at a rearward corner thereof, a single frontal wheel at the front corner of said body opposite said recess carried on a pivotally mounted plate at a lateral side of said body whereby upon pivotal movement of said plate said front wheel is adjusted upwardly or downwardly with respect to said body, cooperating means on said body and on said plate for holding said plate firmly in any of its pivotal positions with respect to said body, adjustably weighted handle means extending from said body in a diagonal upward direction substantially away from said recess, and guard means carried by said motor and disposed about said motor shaft for protecting the sides of the cutting means toward said motor and around at least a part of the periphery of said cutting means whereby said guard means is so disposed to protect said cutting means when said cutting means is any of said vertical, horizontal, or angular positions.

2. The combination of claim 1, wherein said motor is an electric motor, and wherein said planar cutting means comprises a hub affixed to said motor shaft and a plurality of extending planar blades affixed to said hub for rotative motion therewith.

References Cited in the file of this patent

UNITED STATES PATENTS

| | | |
|---|---|---|
| 2,143,057 | Danielson | Jan. 10, 1939 |
| 2,200,698 | McKinney | May 14, 1940 |
| 2,480,922 | Harshman | Sept. 6, 1949 |
| 2,490,171 | Swahnberg | Dec. 6, 1949 |
| 2,504,259 | Ford | Apr. 18, 1950 |
| 2,511,160 | Grobowski | June 13, 1950 |
| 2,556,790 | Berdan | June 12, 1951 |
| 2,564,201 | Hainke | Aug. 14, 1951 |
| 2,671,299 | Orr | Mar. 9, 1954 |
| 2,691,264 | Miller | Oct. 12, 1954 |
| 2,734,325 | La Bonte | Feb. 14, 1956 |
| 2,776,844 | Wilkin | Jan. 8, 1957 |
| 2,795,915 | Miller | June 18, 1957 |

FOREIGN PATENTS

| | | |
|---|---|---|
| 1,007,559 | France | Feb. 6, 1952 |